US012662266B1

(12) United States Patent (10) Patent No.: US 12,662,266 B1
Rodriguez (45) Date of Patent: Jun. 23, 2026

(54) DRONE SPEAKER DEVICE

(71) Applicant: Adrian Rodriguez, Burbank, CA (US)

(72) Inventor: Adrian Rodriguez, Burbank, CA (US)

( * ) Notice: Subject to any disclaimer, the term of this patent is extended or adjusted under 35 U.S.C. 154(b) by 0 days.

(21) Appl. No.: 19/213,005

(22) Filed: May 20, 2025

(51) Int. Cl.
| *B64U 20/80* | (2023.01) |
| *B64D 27/357* | (2024.01) |
| *B64U 10/13* | (2023.01) |
| *B64U 40/10* | (2023.01) |
| *G05D 1/633* | (2024.01) |
| *G05D 1/686* | (2024.01) |
| *H04R 1/02* | (2006.01) |

(52) U.S. Cl.
CPC ........... *B64U 20/80* (2023.01); *B64D 27/357* (2024.01); *B64U 10/13* (2023.01); *B64U 40/10* (2023.01); *G05D 1/633* (2024.01); *G05D 1/686* (2024.01); *H04R 1/028* (2013.01); *B64U 2201/10* (2023.01); *H04R 2420/07* (2013.01); *H04R 2499/13* (2013.01)

(58) Field of Classification Search
CPC ........ B64U 20/80; B64U 10/13; B64U 40/10; B64U 2201/10; B64U 30/295; B64U 30/294; B64D 27/357; B64D 27/02; G05D 1/633; G05D 1/686; H04R 1/028; H04R 2420/07; H04R 2499/13
See application file for complete search history.

(56) References Cited

U.S. PATENT DOCUMENTS

| D816,546 | S | 5/2018 | Wang | |
| 11,084,583 | B2 | 8/2021 | Kratz | |
| 2016/0214713 | A1 | 7/2016 | Cragg | |
| 2017/0297704 | A1* | 10/2017 | Brown | A63H 27/02 |
| 2017/0355469 | A1* | 12/2017 | Canning | B64D 45/00 |
| 2021/0103301 | A1 | 4/2021 | Mccoy | |
| 2022/0084136 | A1 | 3/2022 | Donovan | |
| 2022/0153410 | A1* | 5/2022 | Stewart | B64D 43/00 |
| 2022/0232338 | A1 | 7/2022 | Takahashi | |
| 2022/0388654 | A1* | 12/2022 | Kandasamy | B64C 25/62 |
| 2023/0315128 | A1* | 10/2023 | Bradley | G05D 1/104 |
| | | | | 701/2 |
| 2024/0067370 | A1* | 2/2024 | Hamouz | H04R 1/028 |

FOREIGN PATENT DOCUMENTS

EP            3496426            4/2018

\* cited by examiner

*Primary Examiner* — Rodney A Bonnette

(57) ABSTRACT

A drone speaker device includes a drone housing which has a plurality of propeller openings to pass air through the drone housing. A plurality of propeller units is each located in a respective one of the plurality of propeller openings to fly the drone housing. A processor is positioned within the drone housing and the processor is in electrical communication with each propeller unit of the plurality of propeller units. A personal electronic device receives an audio signal from the extrinsic communication network. A transceiver is positioned within the drone housing which receives the audio signal. A speaker is integrated into the drone housing which emits audible music for the user to hear.

18 Claims, 6 Drawing Sheets

DRONE SPEAKER DEVICE

BACKGROUND OF THE INVENTION

(1) Field of the Invention

The disclosure relates to drone devices and more particularly pertains to a new drone device for following a user and emitting audible music for the user to enjoy. The device includes a drone housing and plurality of propeller units integrated into the drone housing to fly the drone housing. The device includes a personal electronic device that broadcasts an audio signal and a tracking signal to the drone housing. The plurality of propeller units flies the drone housing to follow the tracking signal. The device includes a speaker that is integrated into the drone housing which emits audible music received from the audio signal for the user to enjoy.

(2) Description of Related Art Including Information Disclosed Under 37 CFR 1.97 and 1.98

The prior art relates to drone devices including: a drone speaker system that includes a plurality of drone speaker units which generate a spatial map of a location and deploys the drone speaker units to strategic spots of the location for emitting audible music; a user assistance drone device that includes a drone which follows a client and an audio communication unit integrated into the drone which enables the client to speak with an appropriate authority; an unmanned aerial device that includes a drone and a plurality of speakers integrated into the drone to emit audible music and a video camera integrated into the drone to capture video footage and a plurality of light emitters integrated into the drone to emit visible light; an information processing device that includes a plurality of drones and plurality of loudspeakers each integrated into a respective drone and a master unit which receives an audio signal from each of the drones. In no instance does the prior art disclose a drone speaker device that includes a drone and a personal electronic device that broadcasts an audio signal and a tracking signal to the drone such that the drone follows the tracking signal and speaker integrated into the drone for emitting audible music.

BRIEF SUMMARY OF THE INVENTION

An embodiment of the disclosure meets the needs presented above by generally comprising a drone housing which has a plurality of propeller openings to pass air through the drone housing. A plurality of propeller units is each located in a respective one of the plurality of propeller openings to fly the drone housing. A processor is positioned within the drone housing and the processor is in electrical communication with each propeller unit of the plurality of propeller units. A personal electronic device receives an audio signal from the extrinsic communication network. A transceiver is positioned within the drone housing which receives the audio signal. A speaker is integrated into the drone housing which emits audible music for the user to hear.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
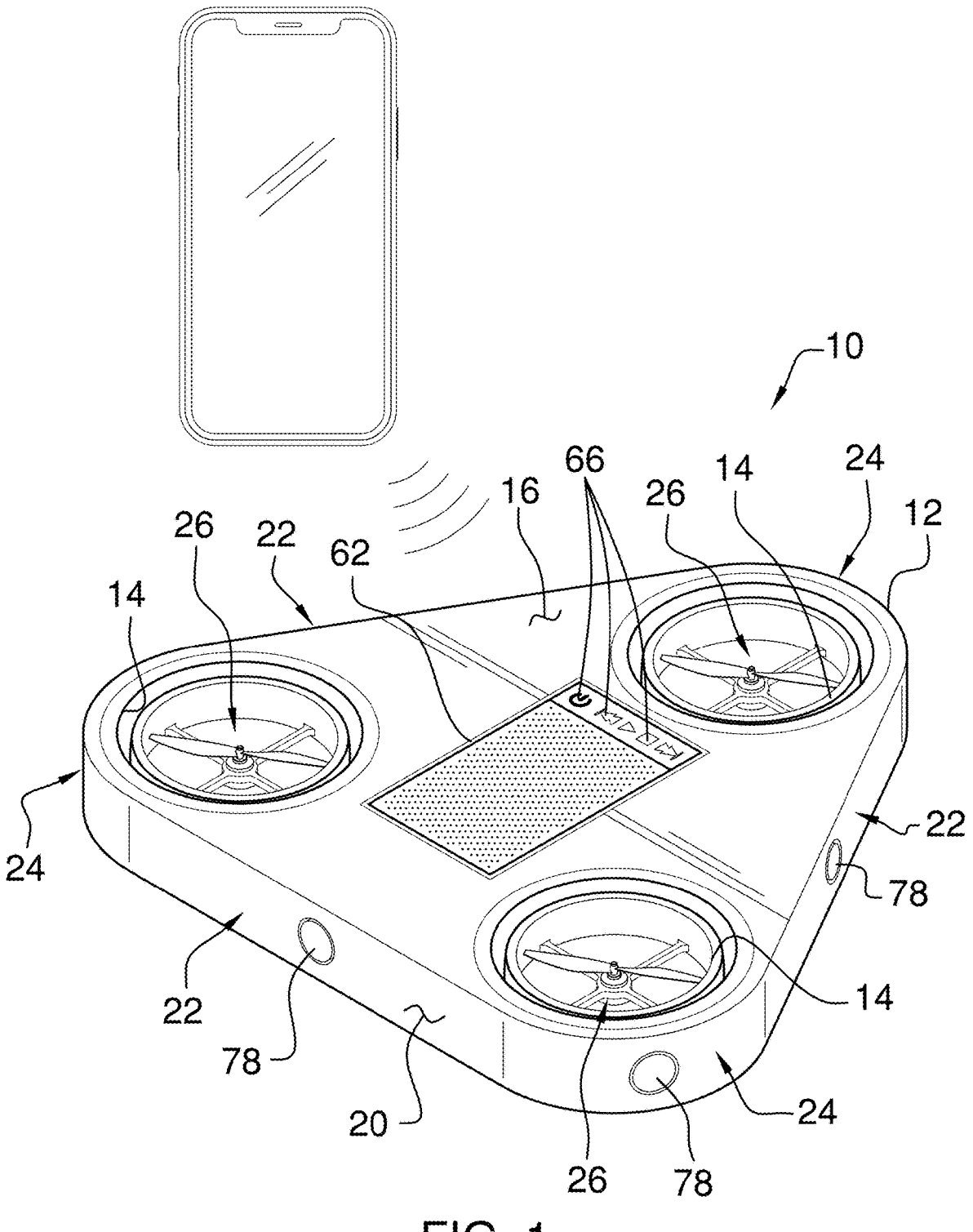
FIG. 1 is a top perspective view of a drone speaker device according to an embodiment of the disclosure.
Figure 2:
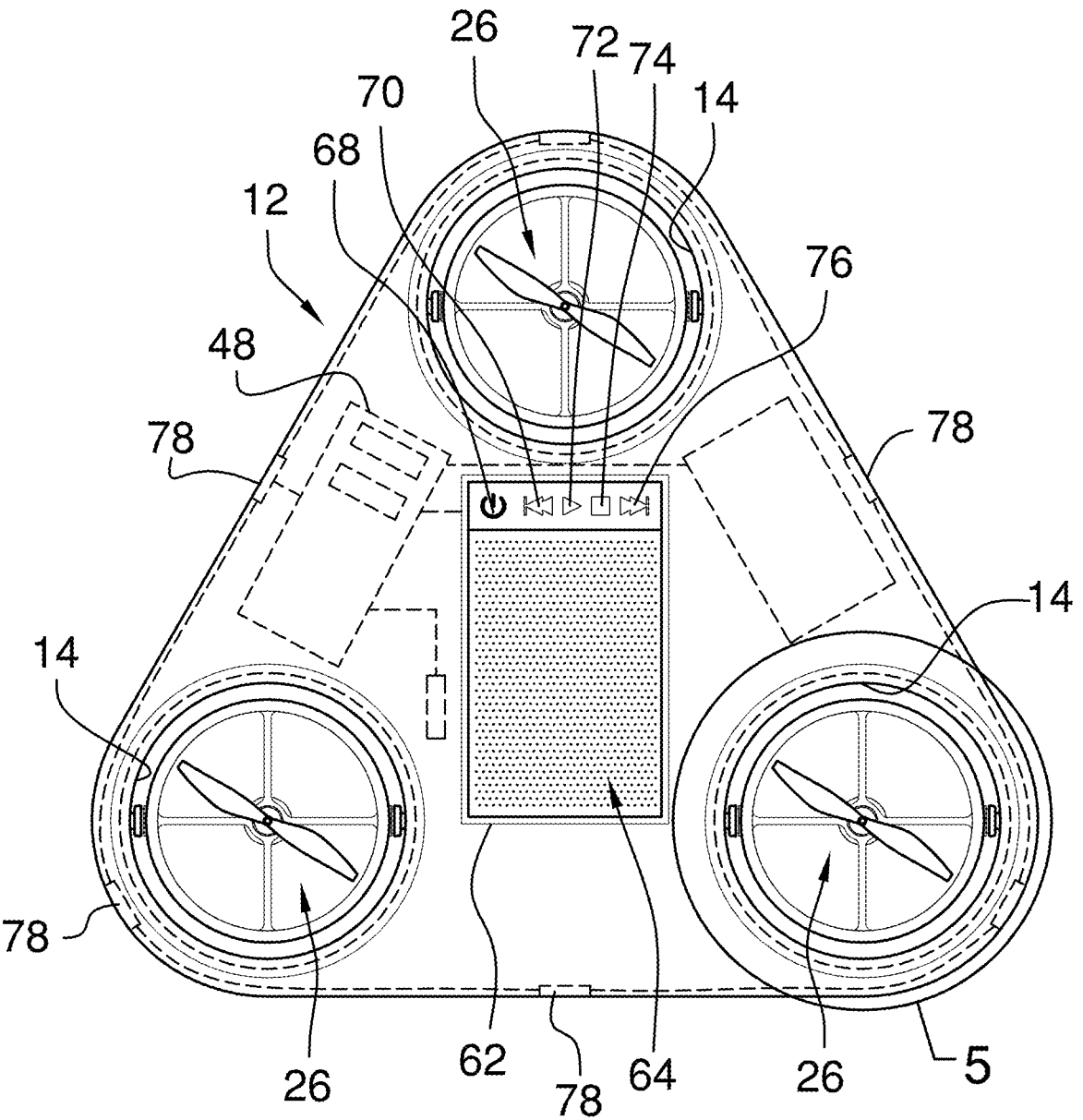
FIG. 2 is a top phantom view of an embodiment of the disclosure.
Figure 3:
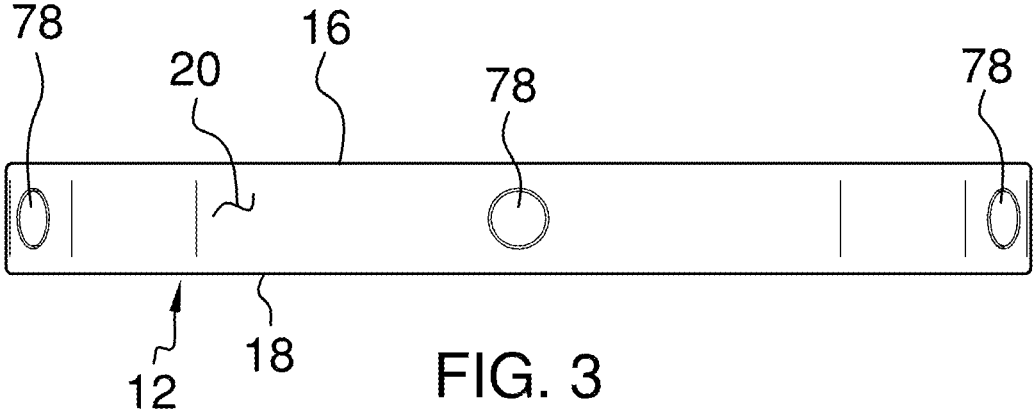
FIG. 3 is a back view of an embodiment of the disclosure.
Figure 4:
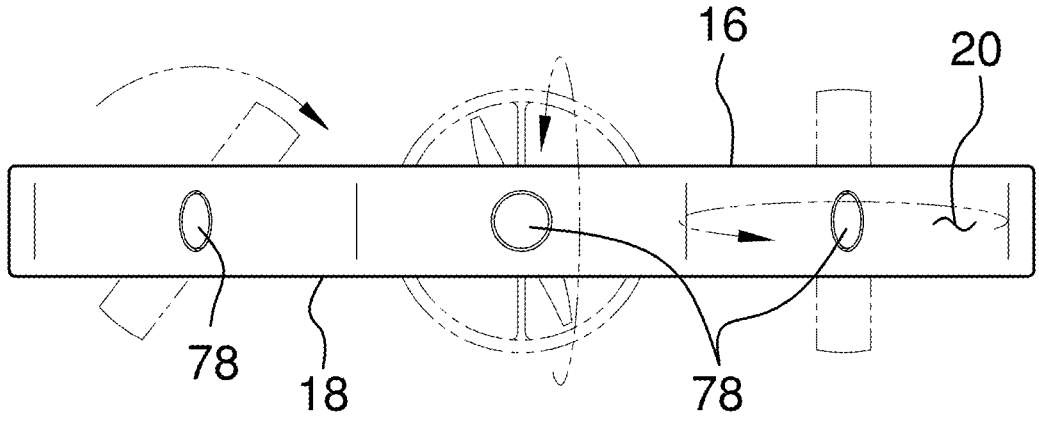
FIG. 4 is a back view of an embodiment of the disclosure showing a plurality of propeller units being pivoted in a drone housing.
Figure 5:
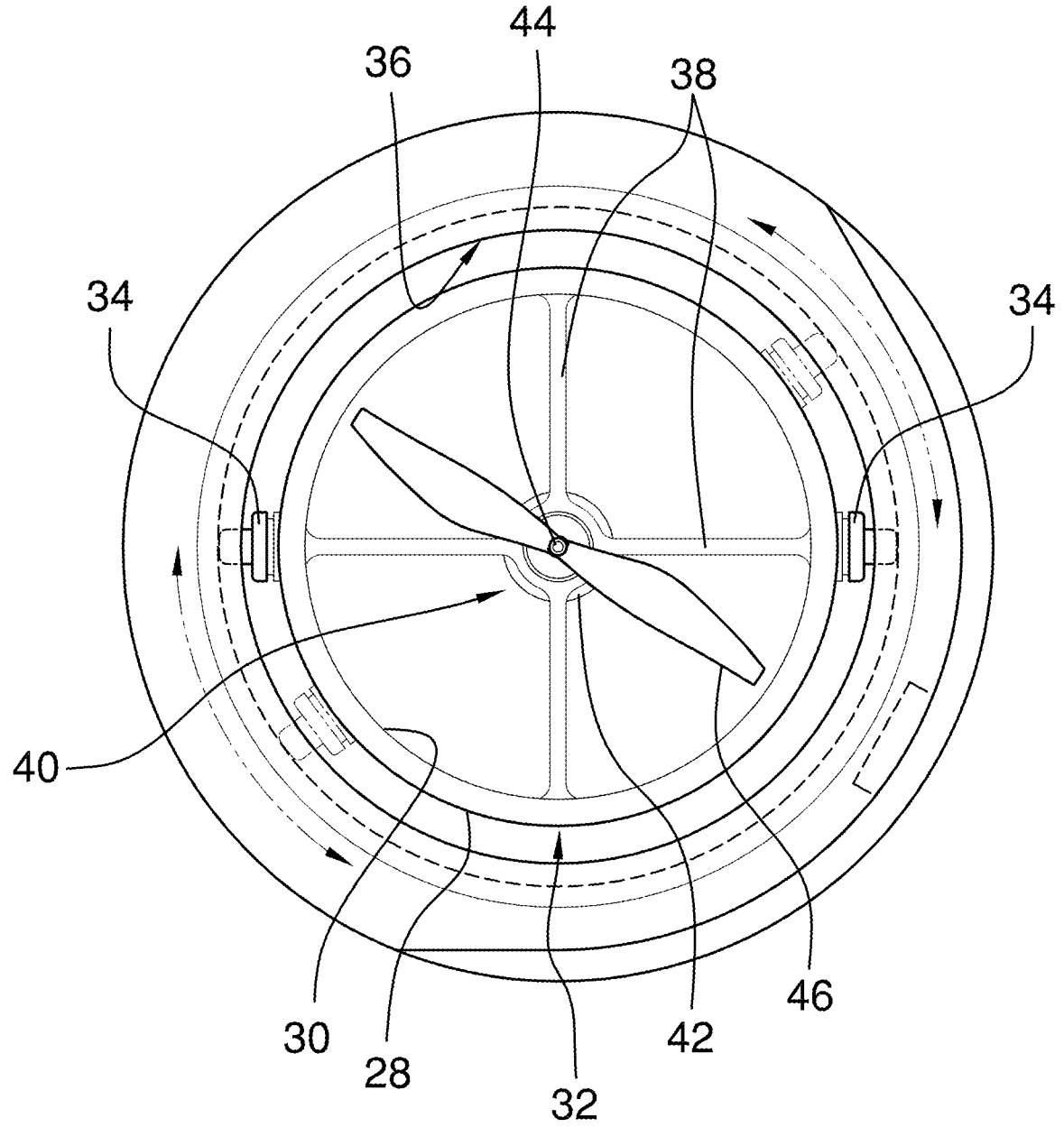
FIG. 5 is a magnified detail view taken from circle 5 of FIG. 2 of an embodiment of the disclosure.
Figure 6:
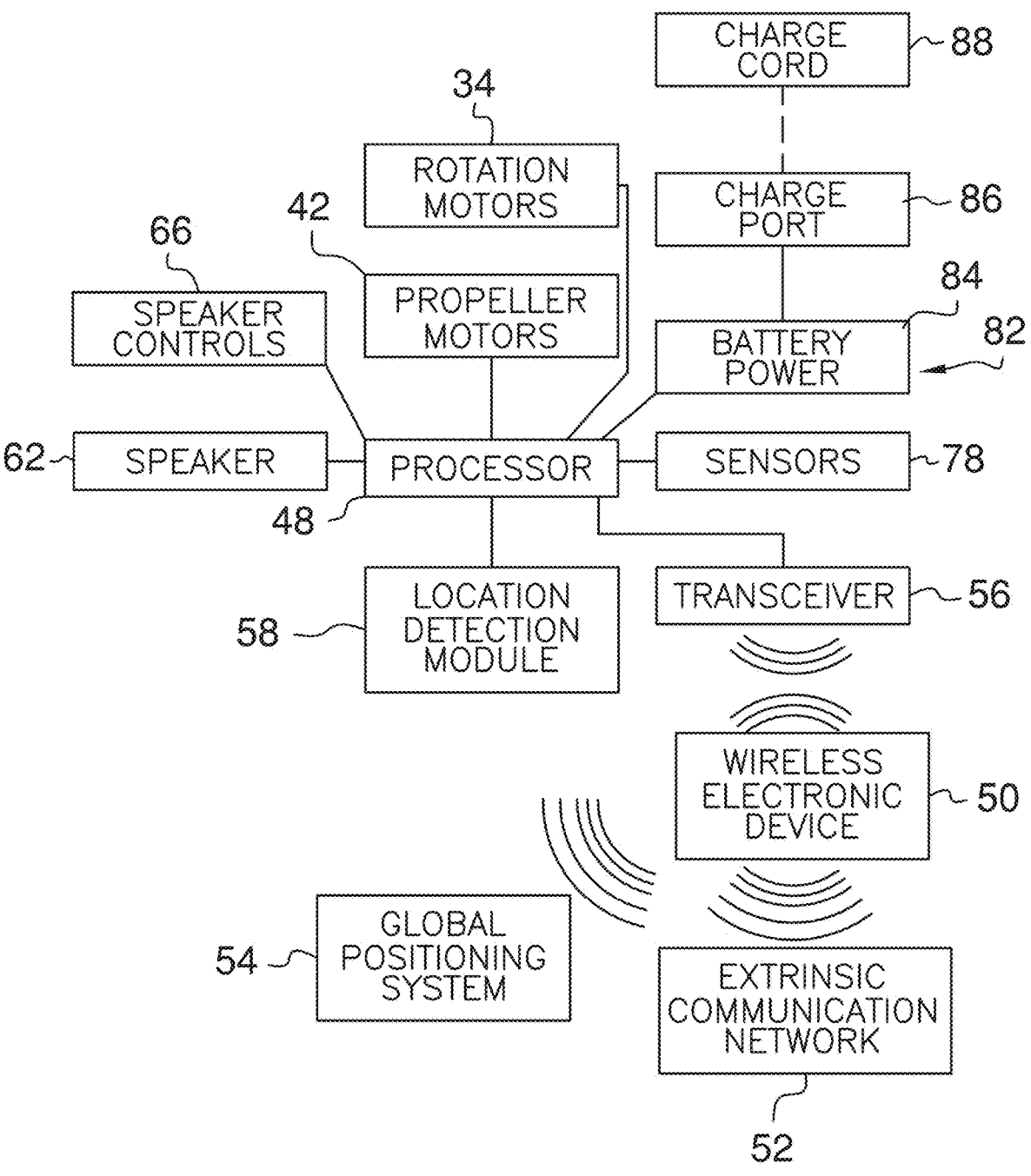
FIG. 6 is a schematic view of an embodiment of the disclosure.
Figure 7:
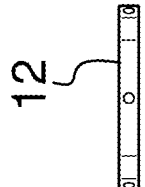
FIG. 7 is a perspective in-use view of an embodiment of the disclosure.
Figure 7:
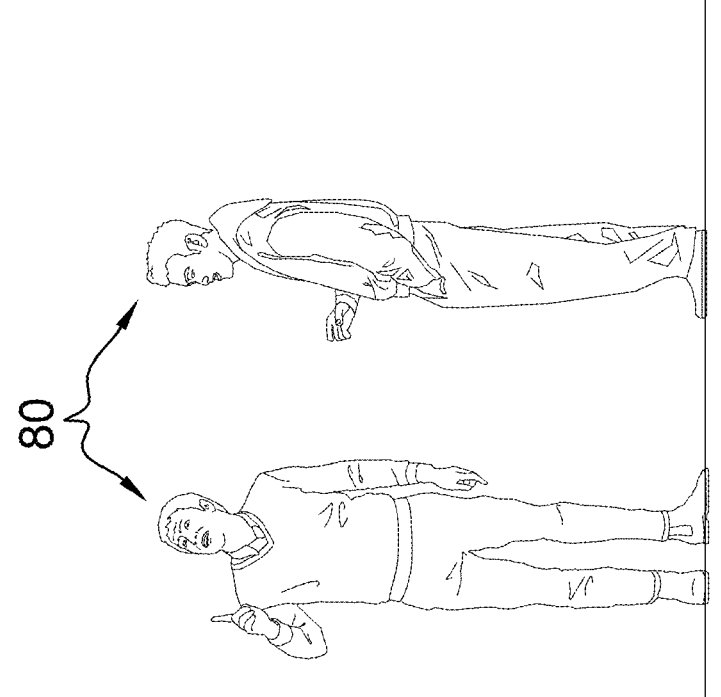
Figure 7:
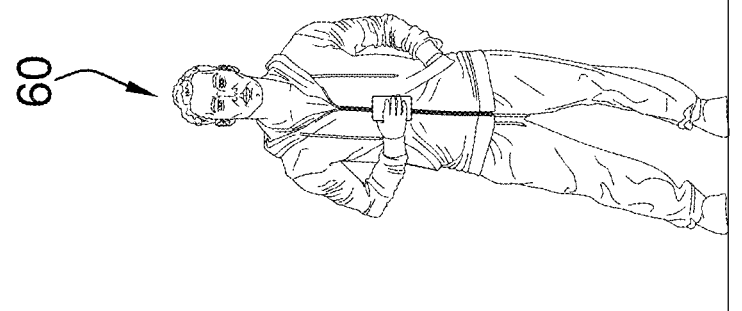

With reference now to the drawings, and in particular to FIGS. 1 through 7 thereof, a new drone device embodying the principles and concepts of an embodiment of the disclosure and generally designated by the reference numeral 10 will be described.

As best illustrated in FIGS. 1 through 7, the drone speaker device 10 generally comprises a drone housing 12 that has a plurality of propeller openings 14 which pass air through the drone housing 12. The drone housing 12 has a top surface 16 and a bottom surface 18 and a perimeter surface 20 extending between the top surface 16 and the bottom surface 18. Furthermore, the perimeter surface 20 has a plurality of intersecting sides 22 and each intersecting side 22 of the plurality of intersecting sides 22 is oriented at an acute angle with each other such that the drone housing 12 has a triangular shape. Each propeller opening 14 of the plurality of propeller openings 14 extends through the top surface 16 and the bottom surface 18. Additionally, each propeller opening 14 of the plurality of propeller openings 14 is aligned with a respective one of three corners 24 of the drone housing 12. Each corner 24 of the drone housing 12 is rounded to accommodate curvature of the plurality of propeller openings 14.

A plurality of propeller units 26 is provided and each propeller unit 26 of the plurality of propeller units 26 is movably coupled to the drone housing 12. Each propeller unit 26 of the plurality of propeller units 26 is located in a respective one of the plurality of propeller openings 14. Furthermore, each propeller unit 26 of the plurality of propeller units 26 urges air to flow through the respective propeller opening 14 to fly the drone housing 12 vertically. In addition, each propeller unit 26 of the plurality of propeller units 26 is pivotable in the respective propeller opening 14. Subsequently, each propeller unit 26 of the plurality of propeller units 26 can urge air to flow laterally across the drone housing 12 to fly the drone housing 12 laterally.

Each propeller unit 26 of the plurality of propeller units 26 comprises an annular ring 28 which has an inside surface 30 and an outside surface 32. Additionally, each propeller unit 26 of the pair of propeller units 26 includes a pair of rotation motors 34 and each rotation motor 34 is coupled to the outside surface 32 of the annular ring 28. The pair of rotation motors 34 is positioned on opposite sides of the annular ring 28 with respect to each other. Each propeller opening 14 of the plurality of propeller openings 14 has a bounding surface 36 and each rotation motor 34 of the pair of rotation motors 34 is coupled to the bounding surface 36 of a respective propeller opening 14. Furthermore, the pair of rotation motors 34 rotates in a first direction or a second direction when the pair of rotation motors 34 is turned on. The annular ring 28 is rotated about an axis extending between the pair of rotation motors 34 when the pair of rotation motors 34 is turned on. Additionally, each rotation motor 34 of the pair of rotation motors 34 may comprise a two direction electrical motor or the like.

Each propeller unit 26 of the plurality of propeller units 26 includes a plurality of support members 38 and each support member 38 of the plurality of support members 38 is coupled to the inside surface 30 of the annular ring 28. The plurality of support members 38 is oriented to extend across the annular ring 28 and the plurality of support members 38 intersect at a center point 40 of the annular ring 28. Each propeller unit 26 of the plurality of propeller units 26 includes a propeller motor 42 that is coupled to the plurality of support members 38 and the propeller motor 42 is located at the center point of the annular ring 28. The propeller motor 42 has an output shaft 44 and the output shaft 44 has a rotational axis which is oriented perpendicular to the plurality of support members 38.

Each propeller unit 26 of the plurality of propeller units 26 includes a propeller 46 that is coupled to the output shaft 44 of the propeller motor 42. The propeller 46 is rotated when the propeller motor 42 rotates the output shaft 44 such that the propeller 46 urges air to travel through the annular ring 28 when the propeller motor 42 is turned on. Additionally, the propeller motor 42 may comprise a single direction electric motor or the like and the propeller 46 may include a pair of pitched blades. As is most clearly shown in FIG. 5, each of the rotation motors 34 can be actuated to travel along the bounding surface 36 of the respective propeller opening 14 when the rotation motors 34 rotates the annular ring 28 in the respective propeller opening 14. In this way the annular ring 28 can be rotated about an axis extending between the top surface 16 and the bottom surface 18 of the drone housing 12 to adjust the direction of thrust generated by the propeller 46 to steer the drone housing 12.

A processor 48 is provided and the processor 48 is positioned within the drone housing 12. The processor 48 is in electrical communication with each propeller unit 26 of the plurality of propeller units 26. Additionally, the processor 48 controls operational parameters of the plurality of propeller units 26. A personal electronic device 50 is included and the personal electronic device 50 is in wireless communication with an extrinsic communication network 52. Furthermore, the personal electronic device 50 receives an audio signal from the extrinsic communication network 52. Additionally, the personal electronic device 50 is in wireless communication with a global positioning system 54 to determine a physical location of the personal electronic device 50. The personal electronic device 50 may comprise a smartphone or other similar device that has wireless communication capabilities and the extrinsic communication network 52 may comprise the internet or a cellular phone network or any other type of global, wireless communication network.

A transceiver 56 is provided and the transceiver 56 is positioned within the drone housing 12. The transceiver 56 is in communication with the personal electronic device 50 and the personal electronic device 50 broadcasts the audio signal to the transceiver 56. Additionally, the personal electronic device 50 broadcasts a tracking signal to the transceiver 56 such that the processor 48 actuates the plurality of propeller units 26 to fly the drone housing 12 along a path which follows the tracking signal. The transceiver 56 may comprise a radio frequency transceiver or the like and the transceiver 56 may employ Bluetooth communication protocols.

The transceiver 56 is in electrical communication with the processor 48; the processor 48 receives the audio signal from the transceiver 56 and the processor 48 receives the tracking signal from the transceiver 56. Additionally, the processor 48 includes a location module 58 and the location module 58 analyzes the tracking signal to determine the location of the drone housing 12 with respect to the personal electronic device 50. The processor 48 controls each propeller unit 26 of the plurality of propeller units 26 to fly the drone housing 12 to follow the personal electronic device 50 based upon the location of the drone housing 12 determined by the location module 58. Subsequently, the drone housing 12 flies along a path which follows a user 60. Moreover, the processor 48 may actuate the plurality of propeller units 26 to retain the drone housing 12 within a pre-determined distance of the personal electronic device 50 which might range between approximately 2.0 meters and 3.0 meters, for example.

A speaker 62 is integrated into the drone housing 12 and the speaker 62 emits audible sounds from the drone housing 12. The speaker 62 is in electrical communication with the processor 48 and the speaker 62 receives the audio signal from the processor 48. Furthermore, the speaker 62 emits audible music for the user 60 to hear. The speaker 62 is positioned on the top surface 16 of the drone housing 12 and the speaker 62 is centrally located on the top surface 16. The speaker 62 may include a grill 64 that is integrated into the top surface 16 of the drone housing 12 to protect the speaker 62 from impact damage.

A plurality of control buttons 66 is each integrated into the speaker 62 such that the plurality of control buttons 66 is accessible to the user 60. Additionally, the plurality of control buttons 66 is in electrical communication with the processor 48. The plurality of control buttons 66 includes a power button 68 and the power button 68 turns the speaker 62 on and off. The plurality of control buttons 66 includes a back button 70 and a play button 72 and a pause button 74 and a forward button 76. The transceiver 56 broadcasts a back command to the personal electronic device 50 when the back button 70 is depressed to replay a song that is being streamed from the personal electronic device 50. Furthermore, the transceiver 56 broadcasts a forward command to the personal electronic device 50 when the forward button 76 is depressed to skip to the end of the song that is being streamed from the personal electronic device 50.

The transceiver 56 broadcasts a play command to the personal electronic device 50 when the play button 72 is depressed. Additionally, the personal electronic device 50 begins to broadcast the audio signal to the transceiver 56 when the personal electronic device 50 receives the play command. The transceiver 56 broadcasts a pause command to the personal electronic device 50 when the pause button 74 is depressed. Furthermore, the personal electronic device 50 ceases broadcasting the audio signal to the transceiver 56 when the personal electronic device 50 receives the pause command.

A plurality of proximity sensors 78 is provided and each proximity sensor 78 of the plurality of proximity sensors 78 is coupled to the drone housing 12 to determine a distance between the drone housing 12 and an obstacle 80. The plurality of proximity sensors 78 is in electrical communication with the processor 48. Furthermore, the processor 48 actuates the plurality of propeller units 26 to fly the drone housing 12 in an unobstructed path to inhibit the drone housing 12 from flying into the obstacle 80. The plurality of proximity sensors 78 may comprise an infrared proximity sensor, for example, and the plurality of proximity sensors 78 may have an operational range which ranges between approximately 2.0 meters and 3.0 meters.

Each proximity sensor 78 of the plurality of proximity sensors 78 is positioned on the perimeter surface 20 of the drone housing 12 to detect the obstacle 80 along a horizontal flight path of the drone housing 12. Furthermore, respective ones of the plurality of proximity sensors 78 is located on a respective one of the plurality of intersecting sides 22 of the perimeter surface 20. The plurality of proximity sensors 78 sense obstacles 80 around a full perimeter of the drone housing 12. Respective ones of the plurality of proximity sensors 78 is located on a respective one of the plurality of corners of the perimeter surface 20 to sense obstacles 80 around the full perimeter of the drone housing 12.

A power supply 82 is positioned within the drone housing 12 and the power supply 82 is in electrical communication with the processor 48. The power supply 82 comprises a rechargeable battery 84 that is positioned within the drone housing 12 and the rechargeable battery 84 is in electrical communication with the processor 48. The power supply 82 includes a charge port 86 which is recessed into the drone housing 12 and the charge port 86 is electrically mated to a charge cord 88. The charge port 86 is in electrical communication with the rechargeable battery 84 for charging the rechargeable battery 84.

In use, the transceiver 56 is synchronized with the personal electronic device 50 to receive the tracking signal and the audio signal. The processor 48 actuates the plurality of propeller units 26 to fly the drone housing 12 to remain within the pre-determined distance of the personal electronic device 50. Furthermore, the speaker 62 emits the audible music while the drone housing 12 follows the personal electronic device 50 such that the user 60 can hear and enjoy the audible music. The drone housing 12 avoids obstacles 80 that are detected by the proximity sensors 78 while the drone housing 12 is following the personal electronic device 50. Thus, the drone housing 12 can avoid striking individuals at a beach, for example, or other public location at which the user 60 is located.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A drone speaker device for emitting audible music while following a user, said device comprising:

a drone housing having a plurality of propeller openings wherein each propeller opening of said plurality of propeller openings is configured to pass air through said drone housing;

a plurality of propeller units, each propeller unit of said plurality of propeller units being movably coupled to said drone housing, each propeller unit of said plurality of propeller units being located in a respective one of said plurality of propeller openings wherein each propeller unit of said plurality of propeller units is configured to urge air to flow through said respective propeller opening to fly said drone housing vertically, each propeller unit of said plurality of propeller units being pivotable in said respective propeller opening wherein each propeller unit of said plurality of propeller units is configured to urge air to flow laterally across said drone housing to fly said drone housing laterally;

a processor being positioned within said drone housing, said processor being in electrical communication with each propeller unit of said plurality of propeller units, said processor controlling operational parameters of said plurality of propeller units;

a personal electronic device, said personal electronic device being in wireless communication with an extrinsic communication network, said personal electronic device receiving an audio signal from said extrinsic communication network, said personal electronic device being in wireless communication with a global positioning system wherein said personal electronic device is configured to determine a physical location of said personal electronic device;

a transceiver being positioned within said drone housing, said transceiver being in communication with said personal electronic device, said personal electronic device broadcasting said audio signal to said transceiver, said personal electronic device broadcasting a tracking signal to said transceiver such that said processor actuates said plurality of propeller units to fly said drone housing along a path which follows said tracking signal;

a speaker being integrated into said drone housing wherein said speaker is configured to emit audible sounds from said drone housing, said speaker being in electrical communication with said processor, said speaker receiving said audio signal from said processor wherein said speaker is configured to emit audible music for the user to hear;

a plurality of control buttons, each control button of said plurality of control buttons being integrated into said speaker wherein said plurality of control buttons is configured to be accessible to the user, said plurality of control buttons being in electrical communication with said processor, said plurality of control buttons controlling operational parameters of said speaker; and a plurality of proximity sensors, each proximity sensor of said plurality of proximity sensors being coupled to said drone housing wherein said plurality of proximity sensors is configured to determine a distance between said drone housing and an obstacle, said plurality of proximity sensors being in electrical communication with said processor, said processor actuating said plurality of propeller units to fly said drone housing in an unobstructed path wherein said plurality of proximity sensors is configured to inhibit said drone housing from flying into the obstacle.

2. The device according to claim 1, further comprising:

said drone housing having a top surface and a bottom surface and a perimeter surface extending between said top surface and said bottom surface;

said perimeter surface having a plurality of intersecting sides;

each intersecting side of said plurality of intersecting sides being oriented at an acute angle with each other such that said drone housing has a triangular shape;

each propeller opening of said plurality of propeller openings extending through said top surface and said bottom surface;

each propeller opening of said plurality of propeller openings being aligned with a respective one of three corners of said drone housing; and each corner of said drone housing being rounded to accommodate curvature of said plurality of propeller openings.

3. The device according to claim 2, further comprising each proximity sensor of said plurality of proximity sensors being positioned on said perimeter surface of said drone housing wherein said plurality of proximity sensors is configured to detect the obstacle along a horizontal flight path of said drone housing.

4. The device according to claim 2, further comprising respective ones of said plurality of proximity sensors being located on a respective one of said plurality of intersecting sides of said perimeter surface wherein said plurality of proximity sensors is configured to sense the obstacles around a full perimeter of said drone housing.

5. The device according to claim 2, further comprising respective ones of said plurality of proximity sensors being located on a respective one of said plurality of corners of said perimeter surface wherein said plurality of proximity sensors is configured to sense the obstacles around the full perimeter of said drone housing.

6. The device according to claim 1, further comprising:

each propeller unit of said plurality of propeller units comprising an annular ring having an inside surface and an outside surface;

each propeller unit of said plurality of propeller units comprising a pair of rotation motors;

each rotation motor of said pair of rotation motors being coupled to said outside surface of said annular ring;

said pair of rotation motors being positioned on opposite sides of said annular ring with respect to each other;

each propeller opening of said plurality of propeller openings having a bounding surface; and each rotation motor of said pair of rotation motors being coupled to said bounding surface of a respective propeller opening.

7. The device according to claim 6, further comprising:

said pair of rotation motors rotating in a first direction or a second direction when said pair of rotation motors is turned on; and said annular ring being rotated about an axis extending between said pair of rotation motors when said pair of rotation motors is turned on.

8. The device according to claim 6, further comprising:

each propeller unit of said plurality of propeller units comprising a plurality of support members;

each support member of said plurality of support members being coupled to said inside surface of said annular ring;

said plurality of support members being oriented to extend across said annular ring; and said plurality of support members intersecting at a center point of said annular ring.

9. The device according to claim 8, further comprising:

a propeller motor being coupled to said plurality of support members;

said propeller motor being located at said center point of said annular ring;

said propeller motor having an output shaft; and said output shaft having a rotational axis being oriented perpendicular to said plurality of support members.

10. The device according to claim 9, further comprising:

each propeller unit of said plurality of propeller units comprising a propeller being coupled to said output shaft of said propeller motor; and said propeller being rotated when said propeller motor rotates said output shaft wherein said propeller is configured to urge air to travel through said annular ring when said propeller motor is turned on.

11. The device according to claim 1, further comprising:

said transceiver being in electrical communication with said processor;

said processor receiving said audio signal from said transceiver;

said processor receiving said tracking signal from said transceiver;

said processor including a location module;

said location module analyzing said tracking signal to determine the location of said drone housing with respect to said personal electronic device; and said processor controlling each propeller unit of said plurality of propeller units to fly said drone housing to follow said personal electronic device based upon said location of said drone housing determined by said location module wherein said drone housing is configured to follow the user.

12. The device according to claim 1, further comprising:

said drone housing having a top surface;

said speaker being positioned on said top surface of said drone housing;

said speaker being centrally located on said top surface; and said plurality of control buttons includes a power button and a back button and a play button and a pause button and a forward button.

13. The device according to claim 12, further comprising said power button turning said speaker on and off.

14. The device according to claim 12, further comprising said transceiver broadcasting a back command to said personal electronic device when said back button is depressed to replay a song being streamed from said personal electronic device.

15. The device according to claim 12, further comprising said transceiver broadcasting a forward command to said personal electronic device when said forward button is depressed to skip to the end of the song being streamed from said personal electronic device.

16. The device according to claim 12, further comprising:

said transceiver broadcasting a play command to said personal electronic device when said play button is depressed; and said personal electronic device beginning to broadcast said audio signal to said transceiver when said personal electronic device receives said play command.

17. The device according to claim 12, further comprising:

said transceiver broadcasting a pause command to said personal electronic device when said pause button is depressed; and said personal electronic device ceasing broadcasting said audio signal to said transceiver when said personal electronic device receives said pause command.

18. A drone speaker device for emitting audible music while following a user, said device comprising:

a drone housing having a plurality of propeller openings wherein each propeller opening of said plurality of propeller openings is configured to pass air through said drone housing, said drone housing having a top surface and a bottom surface and a perimeter surface extending between said top surface and said bottom surface, said perimeter surface having a plurality of intersecting sides, each intersecting side of said plurality of intersecting sides being oriented at an acute angle with each other such that said drone housing has a triangular shape, each propeller opening of said plurality of propeller openings extending through said top surface and said bottom surface, each propeller opening of said plurality of propeller openings being aligned with a respective one of three corners of said drone housing, each corner of said drone housing being rounded to accommodate curvature of said plurality of propeller openings;

a plurality of propeller units, each propeller unit of said plurality of propeller units being movably coupled to said drone housing, each propeller unit of said plurality of propeller units being located in a respective one of said plurality of propeller openings wherein each propeller unit of said plurality of propeller units is configured to urge air to flow through said respective propeller opening to fly said drone housing vertically, each propeller unit of said plurality of propeller units being pivotable in said respective propeller opening wherein each propeller unit of said plurality of propeller units is configured to urge air to flow laterally across said drone housing to fly said drone housing laterally, each propeller unit of said plurality of propeller units comprising:

an annular ring having an inside surface and an outside surface;

a pair of rotation motors, each rotation motor of said pair of rotation motors being coupled to said outside surface of said annular ring, said pair of rotation motors being positioned on opposite sides of said annular ring with respect to each other, each propeller opening of said plurality of propeller openings having a bounding surface, each rotation motor of said pair of rotation motors being coupled to said bounding surface of a respective propeller opening, said pair of rotation motors rotating in a first direction or a second direction when said pair of rotation motors is turned on, said annular ring being rotated about an axis extending between said pair of rotation motors when said pair of rotation motors is turned on;

a plurality of support members, each support member of said plurality of support members being coupled to said inside surface of said annular ring, said plurality of support members being oriented to extend across said annular ring, said plurality of support members intersecting at a center point of said annular ring;

a propeller motor being coupled to said plurality of support members, said propeller motor being located at said center point of said annular ring, said propeller motor having an output shaft, said output shaft having a rotational axis being oriented perpendicular to said plurality of support members; and a propeller being coupled to said output shaft of said propeller motor, said propeller being rotated when said propeller motor rotates said output shaft wherein said propeller is configured to urge air to travel through said annular ring when said propeller motor is turned on;

a processor being positioned within said drone housing, said processor being in electrical communication with each propeller unit of said plurality of propeller units, said processor controlling operational parameters of said plurality of propeller units;

a personal electronic device, said personal electronic device being in wireless communication with an extrinsic communication network, said personal electronic device receiving an audio signal from said extrinsic communication network, said personal electronic device being in wireless communication with a global positioning system wherein said personal electronic device is configured to determine a physical location of said personal electronic device;

a transceiver being positioned within said drone housing, said transceiver being in communication with said personal electronic device, said personal electronic device broadcasting said audio signal to said transceiver, said personal electronic device broadcasting a tracking signal to said transceiver such that said processor actuates said plurality of propeller units to fly said drone housing along a path which follows said tracking signal, said transceiver being in electrical communication with said processor, said processor receiving said audio signal from said transceiver, said processor receiving said tracking signal from said transceiver, said processor including a location module, said location module analyzing said tracking signal to determine the location of said drone housing with respect to said personal electronic device, said processor controlling each propeller unit of said plurality of propeller units to fly said drone housing to follow said personal electronic device based upon said location of said drone housing determined by said location module wherein said drone housing is configured to follow the user;

a speaker being integrated into said drone housing wherein said speaker is configured to emit audible sounds from said drone housing, said speaker being in electrical communication with said processor, said speaker receiving said audio signal from said processor wherein said speaker is configured to emit audible music for the user to hear, said speaker being positioned on said top surface of said drone housing, said speaker being centrally located on said top surface;

a plurality of control buttons, each control button of said plurality of control buttons being integrated into said speaker wherein said plurality of control buttons is configured to be accessible to the user, said plurality of control buttons being in electrical communication with said processor, said plurality of control buttons including a power button and a back button and a play button and a pause button and a forward button, said power button turning said speaker on and off, said transceiver broadcasting a back command to said personal electronic device when said back button is depressed to replay a song being streamed from said personal electronic device, said transceiver broadcasting a forward command to said personal electronic device when said forward button is depressed to skip to the end of the song being streamed from said personal electronic device, said transceiver broadcasting a play command to said personal electronic device when said play button is depressed, said personal electronic device beginning to broadcast said audio signal to said transceiver when said personal electronic device receives said play command, said transceiver broadcasting a pause command to said personal electronic device when said pause button is depressed, said personal electronic device ceasing broadcasting said audio signal to said transceiver when said personal electronic device receives said pause command;

a plurality of proximity sensors, each proximity sensor of said plurality of proximity sensors being coupled to said drone housing wherein said plurality of proximity sensors is configured to determine a distance between said drone housing and an obstacle, said plurality of proximity sensors being in electrical communication with said processor, said processor actuating said plurality of propeller units to fly said drone housing in an unobstructed path wherein said plurality of proximity sensors is configured to inhibit said drone housing from flying into the obstacle, each proximity sensor of said plurality of proximity sensors being positioned on said perimeter surface of said drone housing wherein said plurality of proximity sensors is configured to detect the obstacle along a horizontal flight path of said drone housing, respective ones of said plurality of proximity sensors being located on a respective one of said plurality of intersecting sides of said perimeter surface wherein said plurality of proximity sensors is configured to sense the obstacles around a full perimeter of said drone housing, respective ones of said plurality of proximity sensors being located on a respective one of said plurality of corners of said perimeter surface wherein said plurality of proximity sensors is configured to sense the obstacles around the full perimeter of said drone housing; and a power supply being positioned within said drone housing, said power supply being in electrical communication with said processor, said power supply comprising:

a rechargeable battery being positioned within said drone housing, said rechargeable battery being in electrical communication with said processor; and a charge port being recessed into said drone housing wherein said charge port is configured to be electrically mated to a charge cord, said charge port being in electrical communication with said rechargeable battery for charging said rechargeable battery.

* * * * *